No. 798,467.　　　　　　　　　　　　　PATENTED AUG. 29, 1905.
E. H. TAYLOR.
MACHINE FOR MAKING HEELS.
APPLICATION FILED JULY 28, 1897.

Witnesses:　　　　　　　　　　　Inventor:
　　　　　　　　　　　　　　　　Eugene H. Taylor

No. 798,467. PATENTED AUG. 29, 1905.
E. H. TAYLOR.
MACHINE FOR MAKING HEELS.
APPLICATION FILED JULY 28, 1897.

Witnesses.
Lefine Hall Rice
Edith J. Anderson

Inventor:
Eugene H. Taylor
by Macleod Calver & Randall
Attorneys.

No. 798,467. PATENTED AUG. 29, 1905.
E. H. TAYLOR.
MACHINE FOR MAKING HEELS.
APPLICATION FILED JULY 28, 1897.

Witnesses:
Lorine Hall Rice
Edith J. Anderson

Inventor.
Eugene H. Taylor
by Macleod Calver Randall
Attorneys.

# UNITED STATES PATENT OFFICE.

EUGENE H. TAYLOR, OF LYNN, MASSACHUSETTS.

MACHINE FOR MAKING HEELS.

No. 798,467. Specification of Letters Patent. Patented Aug. 29, 1905.

Application filed July 28, 1897. Serial No. 646,192.

*To all whom it may concern:*

Be it known that I, EUGENE H. TAYLOR, a citizen of the United States, residing at Lynn, in the county of Essex and State of Massachusetts, have invented certain new and useful Improvements in Machines for Making Heels, of which the following is a specification, reference being had therein to the accompanying drawings.

The invention will be described first with reference to the accompanying drawings, in which latter I have illustrated the best embodiment thereof which I have yet contrived, and after having explained the principle of the invention and the said embodiments I will particularly point out and distinctly define the characteristic features of the invention in the claims at the close of this specification.

1 designates the framing of the machine.

Having reference more particularly to Figs. 1, 3, and 5, 2 designates the cutting-die, 3 the cutting-block, and 4 the anvil, which has applied to the exterior thereof the said cutting-block. 5 5 are fixed or stationary cutters, and 6 6 are moving cutters coöperating therewith. These cutters 5 5 and 6 6 serve for trimming the stock of which heels are to be made prior to the application of the said stock to the die 2. Preferably I place one pair of the cutters at each side of the die, so that the operator may use either pair of cutters as may prove most convenient in the course of his work. 7 designates a guard adjacent to each pair of cutters and intended to protect against injury to the operator by the cutters. 8 is the bed or table on which the die and cutters are mounted.

9, Figs. 2, 4, 6, 7, 14, 15, and 16, is the main or driving shaft of the machine, on which shaft are mounted the band-pulley 10 and the various cams, to which reference is made hereinafter.

The die 2 is held in place upon the table 8 in customary manner. I have shown it engaged and secured by the slides 11 11, Figs. 1, 3, and 5, the inner ends of which enter recesses in the exterior of the die, the said slides being secured in place by means of bolts 12 12, the stems of which pass through the slots 13 13 in the said slides and the threaded portions of the said stems entering tapped holes in the table 8, washers 14 14 being placed between the heads of the said bolts and the upper sides of the said slides. The devices described enable the die to be applied and removed and to be replaced by others of varying sizes whenever required.

Figure 1:
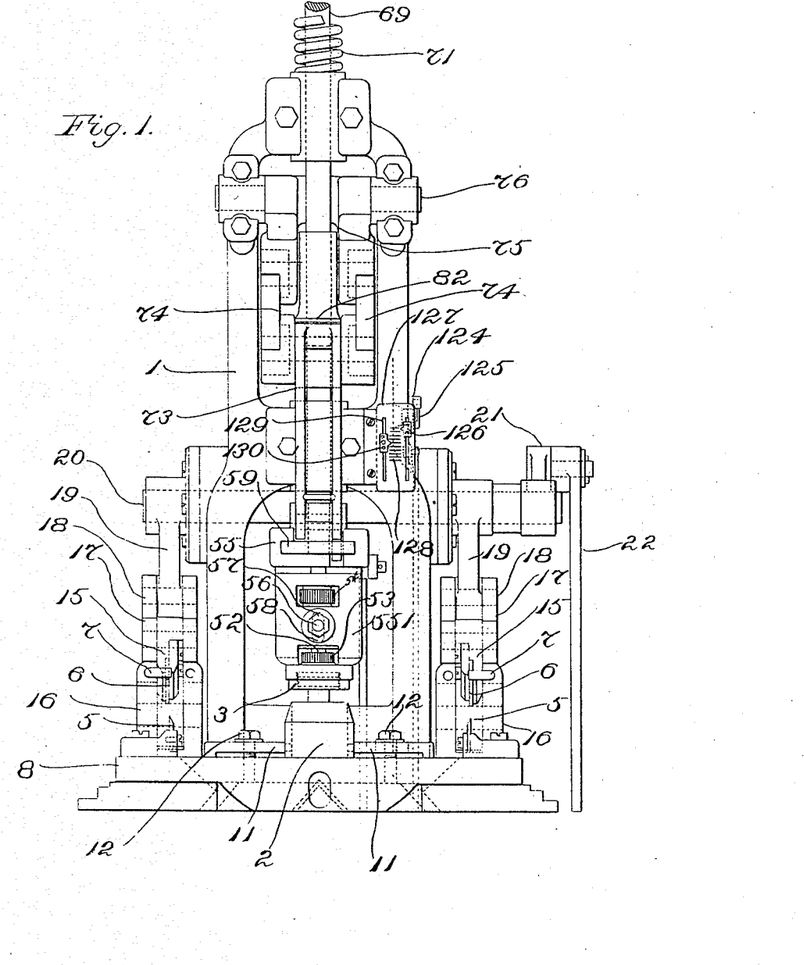
Figure 1 of the drawings shows in front elevation the upper part of a machine embodying my invention.
Figure 2:
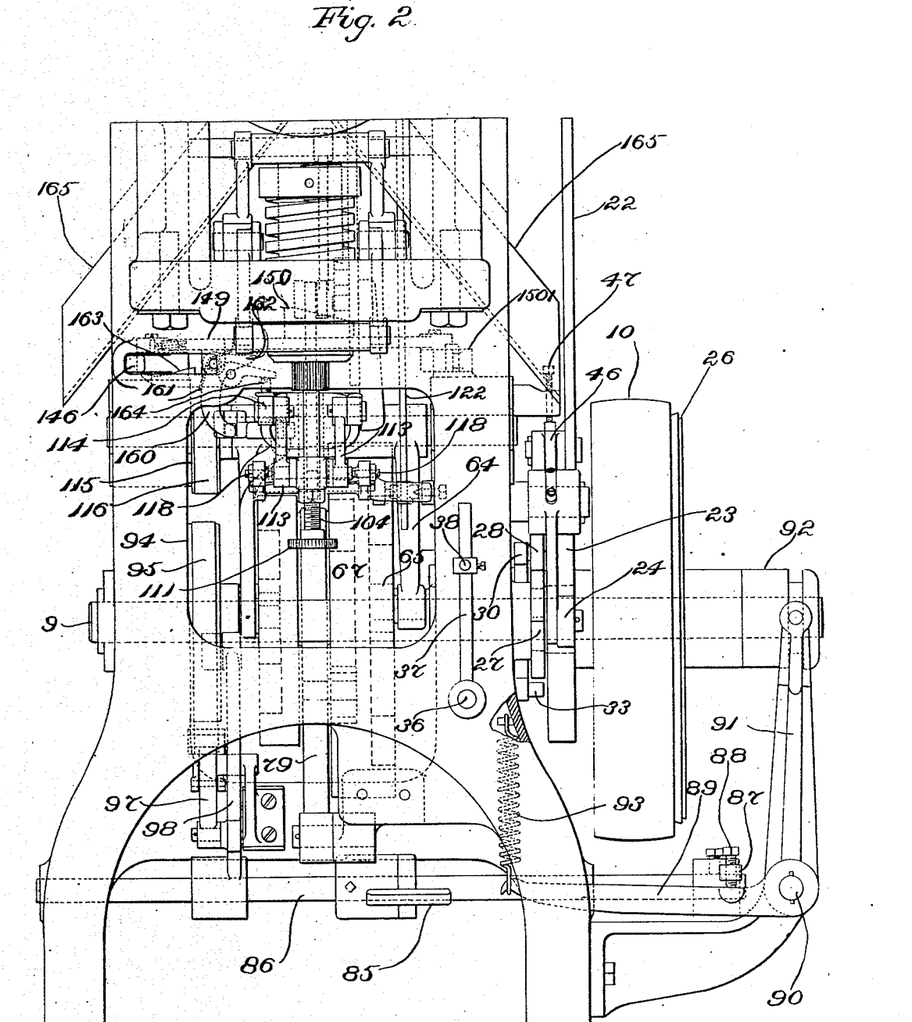
Fig. 2 shows in like elevation the remaining part of the said machine.
Figures 3, 19:
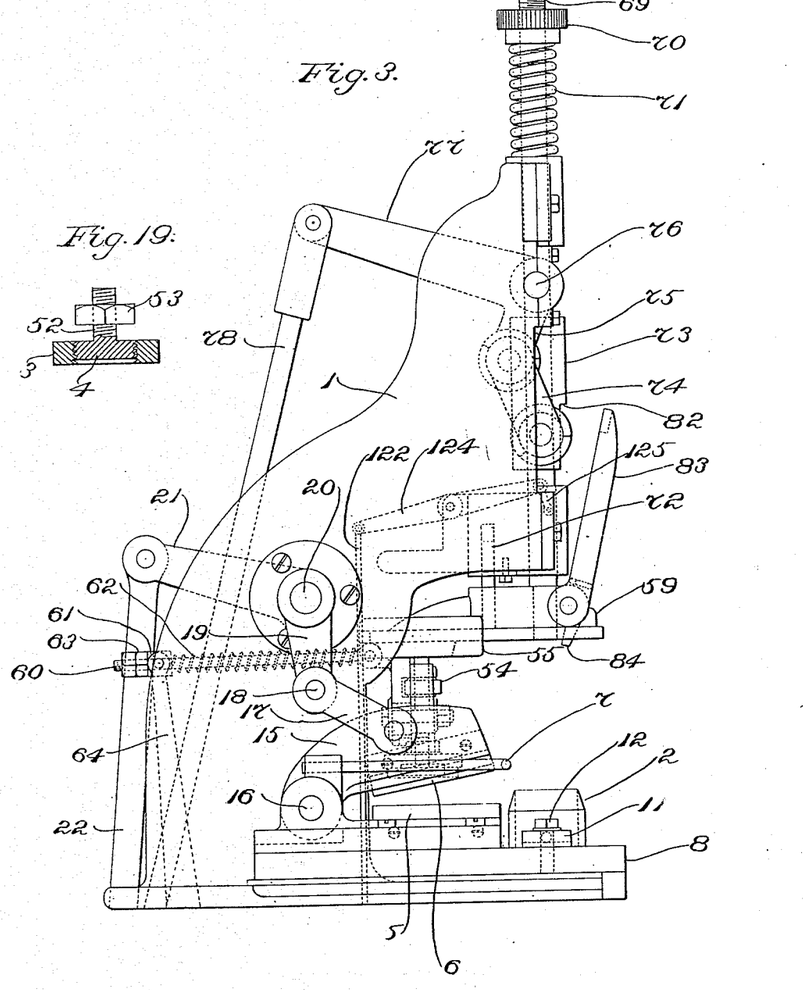
Fig. 3 is a view in side elevation of the upper part of the said machine.
Fig. 19 is a view in detail of the anvil and cutting-block.
Figures 15, 16, 17, 18:
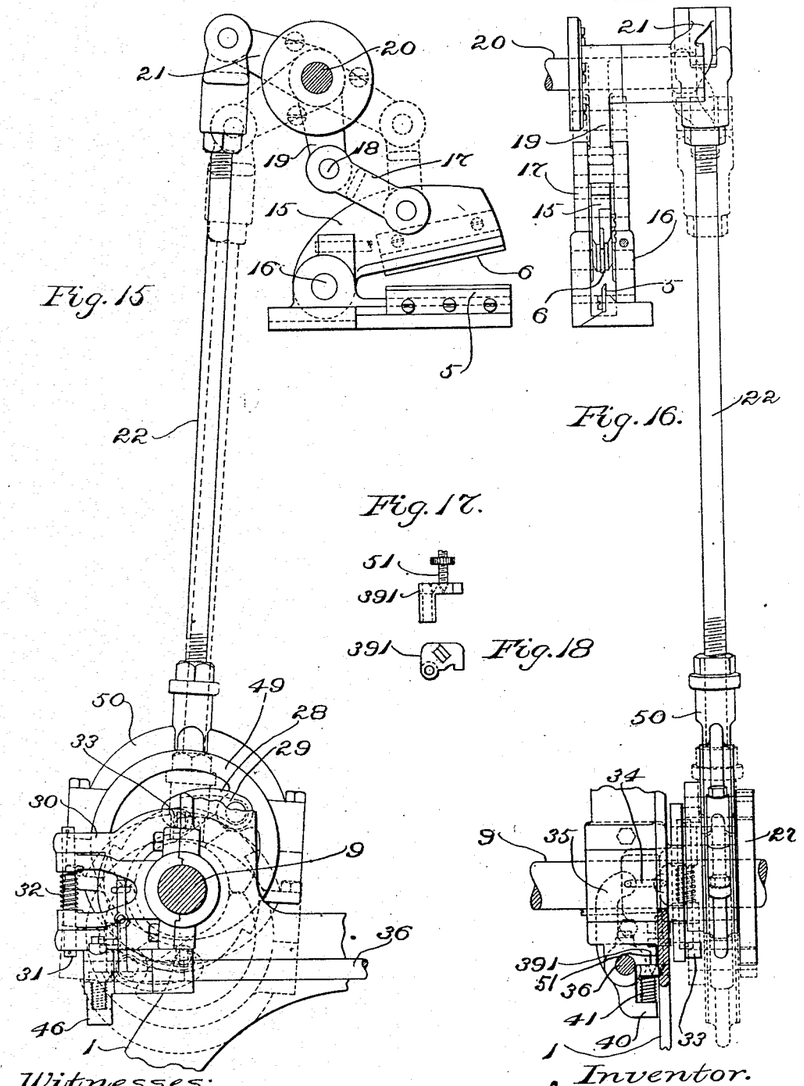
Fig. 15 is a view, partly in side elevation, with certain portions in vertical section, of a second form of cutter-actuating mechanism.
Fig. 16 is a view thereof in elevation from the right-hand side in Fig. 15.
Fig. 17 is a view in side elevation of the dog 39¹ and the tripping device therefor pertaining to the mechanism of Figs. 15 and 16.
Fig. 18 is a plan view of the said dog 39¹.

I have shown each movable cutter 6 as carried by an arm 15, Figs. 1 and 3 and also Figs. 15 and 16, the said arm being pivoted at 16 to a support rising upward from the table 8, and the said arm having pivotally connected thereto one end of a link or pair of links 17, the other end of which is connected pivotally at 18 with a vibrating arm 19. The said arm 19 is fast on the rock-shaft 20, there being one such arm at each end of the said rock-shaft, and the said rock-shaft is furnished with an arm 21, having connected thereto the upper end of the rod 22, the lower end of the said rod being connected (see Figs. 2, 4, 6, 7, 15, and 16) to the actuating mechanism from which is taken the motion which is transmitted to the arms 19 19 and thence to the movable cutters 6 6. The link or links 17 and arm 19 operate on the principle of a toggle in actuating the movable cutter. I have shown in the drawings two arrangements for actuating the said arms 19 19 and movable cutters 6 6, both of these arrangements being characterized by the fact that they leave the movable cutters normally in a state of rest and separated from the fixed or stationary cutters to permit of the introduction of the stock between them and the further fact that when the actuating mechanism is brought into play motion is transmitted from a power-driven moving part of the machine to occasion a single action of the movable cutters, after which the said movable cutters again remain at rest in an open condition until the next action thereof is desired, the working of the movable cutters being wholly under the control of the operator and at the will of the latter. In the case of the arrangement which is represented in Figs. 2, 4, 6, and 7 the lower end of the connecting-rod 22 is connected to one arm of the cam-operated lever 23, the latter being in the form of a bell-crank and carrying upon its respective arms the rollers 24 24, which bear upon the surface of the cam 25. With the said cam, it constituting one form of rotary actuator, I combine means whereby to enable the same at the will of the operator to be rotated to an extent sufficient to close the movable cutters against the fixed or stationary cutters and then restore the said movable cutters to their raised or opened condition, where they are left at rest. I effect this working of the cam 25 by coupling it temporarily to some continuously-moving power-driven part of the machine. For convenience I utilize in this connection the band-pulley 10, which latter is mounted loosely upon the shaft 9 and is driven continuously by means of a belt or band (not shown) so long as the machine is in use for the time being. Various forms of devices may be employed for coupling the cam 25 temporarily to the moving band-pulley 10 and uncoupling it therefrom after the said cam has been moved to the required extent to actuate the movable cutters. A convenient arrangement for the purpose is shown in Figs. 2, 6, 7, 8, and 9. It comprises a locking-wheel, (here constituted by a ratchet-wheel 27,) which latter is fast upon the hub of the loose band-pulley 10, a dog or pawl 28, pivoted to the cam 25 and adapted to engage with one of the locking-detents with which wheel 27 is provided. In the present instance the said dog or pawl 28 engages by its end after the manner of a pawl against the abrupt end or face of one or another of the teeth of the ratchet-wheel 27. A spring 29 acts upon the dog or pawl 28 with a tendency to press it toward the ratchet-wheel. 30 is a frame (see more particularly Fig. 6) mounted to swing upon a vertical pin 31 at the rear of the machine and acted upon by a spring 32, which tends to hold the forward end of the said frame 30 pressed toward the right-hand side in Figs. 2 and 7. To the said frame 30 I apply one or more pins 33 33, according to circumstances, as explained hereinafter, which project laterally into the path of rotation of the free end of the dog or pawl 28. In the drawings (see more particularly Figs. 2, 6, and 7) I have shown two pins 33 33, and the upper of these pins is shown as supporting the free end of the dog or pawl 28 out of engagement with the teeth of the ratchet-wheel 27. As indicated clearly in Fig. 6, the dog or pawl 28 is shaped underneath like a hook, and in Figs. 2, 6, and 7 the hook is engaged with the upper pin 33 in such manner as to prevent rotation of the cam in the direction of the rotation of the band-pulley 10, such direction being indicated by the arrow in Fig. 6. For the purpose of moving the frame 30 laterally to the left in Figs. 2 and 7, which will withdraw the upper pin 33 from engagement with the hook-shaped dog or pawl 28 and allow the said pawl or dog to move radially inward under the action of the spring 29 into engagement with the ratchet-wheel 27, which will cause the cam to rotate in unison with the band-pulley, I connect the frame 30, by means of a link 34, with the upper extremity of an arm 35, which last is shown separately in Fig. 9. The said arm 35 is sleeved loosely upon the rear end of a shaft 36, the forward end of which shaft has attached thereto an arm 37, (see more particularly Figs. 2 and 4,) carrying a projection 38, that is disposed in convenient position to be pressed against by the knee of the operator. When the shaft 36 is rocked toward the left by pressure applied to the projection 38 on the arm 37, the arm 35, it being at the time coupled to the shaft 36 by means of the dog 39, acts through the link 34 to draw the frame 30 to the left, thereby withdrawing the upper pin 33 from the spring-pressed pawl or dog 28 and allowing the latter to move into engagement with the ratchet-wheel 27, whereupon rotary movement is communicated to the cam 25, and the latter acts through the lever 23 and connections hereinabove described to communicate movement to the movable cutters. The dog 39 (shown separately in Fig. 8) is mounted in vertical position on the boss 40, which is fast on the rear end of the shaft 36, and it is acted upon by a spring 41, which acts with a tendency to hold the head 42 of the said dog 39 in position to engage the shoulder 43 on the hub of the arm 35. It is in consequence of the engagement of the said head 42 of the dog 39 with the said shoulder 43 that the said arm 35 is swung to the left by the above-described movement of the shaft 36, thereby moving the frame 30 and releasing the dog or pawl 28, permitting it to move into engagement with the ratchet-wheel 27. In order that the said dog or pawl may be disengaged from the said ratchet-wheel as soon as the cam 25 has been moved sufficiently to close the cutters and open them again, I arrange for allowing the frame 30 to be turned by the action of spring 32 back into its original position in time to enable a pin 33 thereon to act against the under side of the dog or pawl 28, whereby to lift said dog or pawl out of engagement with the ratchet-wheel 27 and also to enable the said pin to engage with the hook of the said dog or pawl 28, and thereby arrest the movement of the cam. To this end I provide upon the side of the cam 25 one or more laterally-projecting pins 44 44, one of which at the proper instant strikes the tail 45 of the dog 39, turning the said dog so as to withdraw its head 42 from engagement with the shoulder 43 of the arm 35, thus releasing the said arm and allowing the spring 32 to act to swing the frame 30 back into its original position, thereby carrying a pin 33 into the range of movement of the dog or pawl 28, the release of the arm 35 and return of the frame 30 to its original position being effected almost immediately after the movement of the cam 25 in unison with the shaft 9 has been begun. In case the cam 25 is caused to make a complete revolution at each movement thereof a single pin 33 on the frame 30 and a single pin 44 on the cam 25 will be sufficient. However, in order to give greater quickness of action to the cutting devices and cause the action of the said devices to take place within less than a revolution of the said cam I make the latter double or of figure-8 shape, each half thereof serving to complete one action of the cutting devices, and I provide two pins 33 33 on the frame 30 diametrically opposite to each other, so as to engage with the dog or pawl 28 after each half-revolution of the cam 25, two pins 44 44 being provided on the said cam also diametrically opposite each other. For the purpose of retarding or checking the upstroke of the lever 23, such being the movement which occasions the return of the movable cutters 6 6 to their open position, I attach a spring 46 to the said lever 23, the free extremity of which bears against an abutment on the machine-framing, the said abutment being herein shown as constituted by a screw 47, the adjustment of which enables the checking or retarding of the return movement of the parts to be varied as required. For the purpose of arresting the return movement of the arm 35 and frame 30 under the action of the spring 32 I apply to the arm 35 a screw 48, which strikes against a fixed portion of the machine-framing, the adjustment of this screw enabling the normal position of the parts to be varied as circumstances may render necessary.

The arrangement which is represented in Figs. 15 and 16 employs a rotary actuator in the shape of an eccentric 49 in lieu of the double cam 25, which has been referred to, this eccentric having applied thereto the strap 50, which is connected with the rod 22. In this arrangement the ratchet 27 on the hub of the band-pulley is employed, and the spring-actuated dog or pawl 28 is pivoted to the eccentric 49, the swinging frame 30, with its diametrically opposite pins 33 33 and spring 32, being employed also, the said frame being connected, as in the first arrangement, by means of a link 34 with the arm 35, which is mounted loosely on the rock-shaft 36. In this case also a dog (designated 391 in Figs. 16, 17, and 18) is provided for engagement with the shoulder of the arm 35 to cause the movement of the rock-shaft 36 to communicate movement to the arm 35. The said dog 391 is tripped or disengaged from the said shoulder by contact with the screw 51, applied to the framing 1 or other support, (see more particularly Fig. 17 and dotted lines, Fig. 16,) the point of the said screw being made tapering and engaging with a beveled surface on the dog 391. The eccentric 39 is caused to rotate to the extent of a half-revolution at a time, and in order that a half-revolution of the said eccentric may serve to effect a complete action of the cutters I cause the pivots 18, which join the links 17 17 to the arms 19 19, to pass beyond the centers from the full-line position in Fig. 15 to the dotted-line position in the said figure, and vice versa. It will be obvious that the movement of the arms 19 19 and links 17 17 from the said full-line position to the said dotted-line position will close the cutters and open them again, this taking place in one half-revolution of the eccentric and that the action will be repeated in the next half-revolution of the eccentric. 361 (see Fig. 4) is a spring that is applied to shaft 36 and serves for the purpose of returning said shaft and the parts which are fast therewith to their original position after the operator relieves the arm 30 of pressure.

The cutting-block 3 screws onto the exterior of the anvil 4, (see Fig. 19,) the anvil being made circular in shape and the cutting-block being made in the form of a ring of hardened steel or other suitable material. The anvil is provided with a threaded stem 52, which passes upward through the lower cross-piece of the adjustable member 551 of the carrier 55, the said stem having applied thereto above the said cross-piece a nut 53, the parts being secured in place by tightening up the said nut until the parts are clamped against the opposite sides of the cross-piece. The cutting-block may be turned or rotated on the anvil after loosening up the nut to enable the cutting-block to be adjusted vertically with reference to the anvil. The anvil and cutting-block together are adjusted vertically to compensate for wear of either the cutting-block or the die, or both, by means of the screw 54 engaging with the vertically-adjustable portion 551 of the carrier 55, the anvil and cutting-block being applied to the said portion 551 as aforesaid, the said portion 551 being secured to a vertically-depending extension of the main portion of the carrier 55 by the bolt 56 and nut 57, the said bolt passing through a slot 58 in the said vertical extension of the main portion of the carrier. The carrier 55 is connected with the vertically-reciprocating head 59, one of the said parts being provided with flanges and the other with slideways fitting the said flanges, so as to enable the carrier to be moved horizontally upon the said head from front to rear in the machine, while at the same time it is compelled to move vertically in unison with the head. With the carrier I combine means for moving the same upon the reciprocating head aforesaid in such manner that when the head and carrier are elevated the carrier, together with the anvil and cutting-block connected therewith, occupy a position rearward of the die, leaving the latter uncovered for the application thereto of the stock which is to be employed in the manufacture of a heel, and that when the cutting-block is being brought forward again into position over the die prior to descending to compress the stock against the cutting edge of the die and into the hollow of the latter, the carrier and the parts carried thereby move in a horizontal or substantially horizontal direction, I so adjust the parts that in this forward movement of the carrier the lower faces of the anvil and cutting-block pass along as close as possible to the edge of the die, leaving just room enough for the piece of stock resting on the said edge. Hence should anything be resting above the die —for example, a portion of the hand of the operator—it will be pushed forward out of the way by the edge of the advancing cutting-block. It sometimes may happen that in the horizontal advancing movement of the carrier something may be caught and compressed between the forward edge of the cutting-block and the rear edge of the die. For the purpose of guarding against damage to the machine or injury to the operator in this case as a result of the forward movement of the cutting-block I cause this advancing movement to be effected through the aid of yielding connections which will allow the carrier to give or become arrested by any such obstacle in its forward movement. Thus 60 is a rod which is pivoted at its forward end to the carrier. (See Fig. 3.) 61 is a block mounted loosely on the outer end of the said rod. 62 is a spring encircling the said rod between the block 61 and a suitable stop or abutment, the latter being here shown as constituted by the enlargement or eye which is applied to the pivot-pin connecting the rod to the carrier. 63 represents nuts on the threaded free extremity of the rod 60, they serving to determine the position which is assumed by the block 61 under the action of the spring 62. 64 is a lever which is sleeved on the cross-rod 68, it having the upper arm thereof connected to the said block 61 and the lower arm thereof provided with a roller working in the groove 66 of the cam 67, mounted on the shaft 9. (See Figs. 2, 12, and 14.) The cam 67 acts, through the connections described, to impart the forward and the rearward movements to the carrier. Should anything intervene between the forward edge of the cutting-block and the rear edge of the cutting-die, the spring 62 will yield, allowing the lever 64 to complete its advancing movement while the carrier stands still. With the head 59 I combine means for communicating a vertical reciprocating motion thereto, so as to compress the cutting-block against the edge of the die and raise it therefrom again, and also devices whereby in case for any reason whatever the carrier fails to complete the proper extent of forward motion, so as to place the cutting-block in position above the die, the descent of the head is prevented. In the drawings (see more particularly Figs. 1 and 3) I show the head 59 as mounted on the lower end of the vertical slide-rod 69, the upper end of which is threaded and has applied thereto a nut 70, between which and the upper end of one of the guides for the said rod 69 a spring 71 is compressed. This spring presses the rod 69 and head 59 upward and acts to hold them in their normal elevated position, a cushion of rawhide (not shown) preferably being employed as a stop and engaging with the head 59 to arrest the upward movement which is produced by the action of the spring 71. 72 is a guiding or steady pin applied to the said head and moving in a vertical hole provided in a fixed part of the framing.

Figure 4:
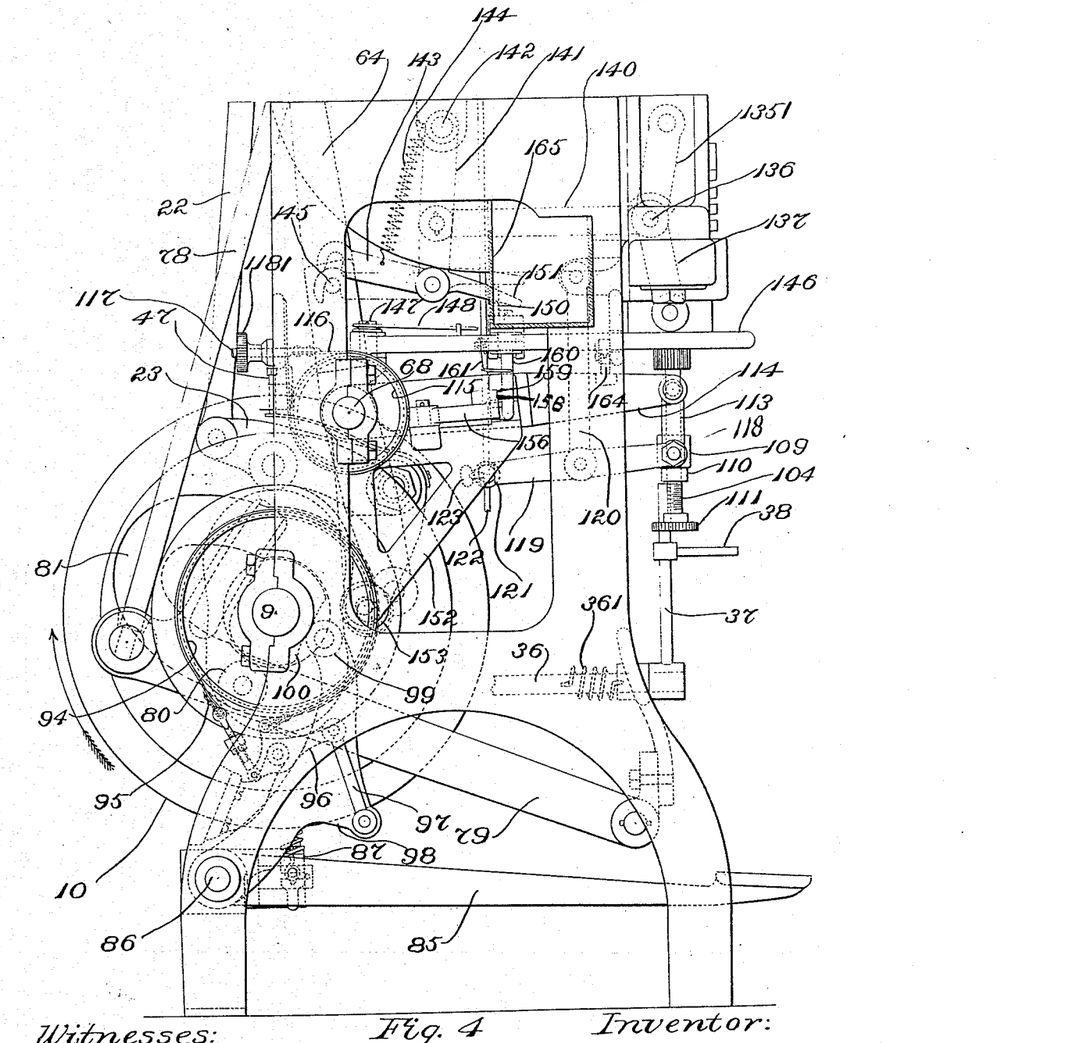
Fig. 4 is a view in like elevation of the lower part thereof.
Figures 11, 12, 13:
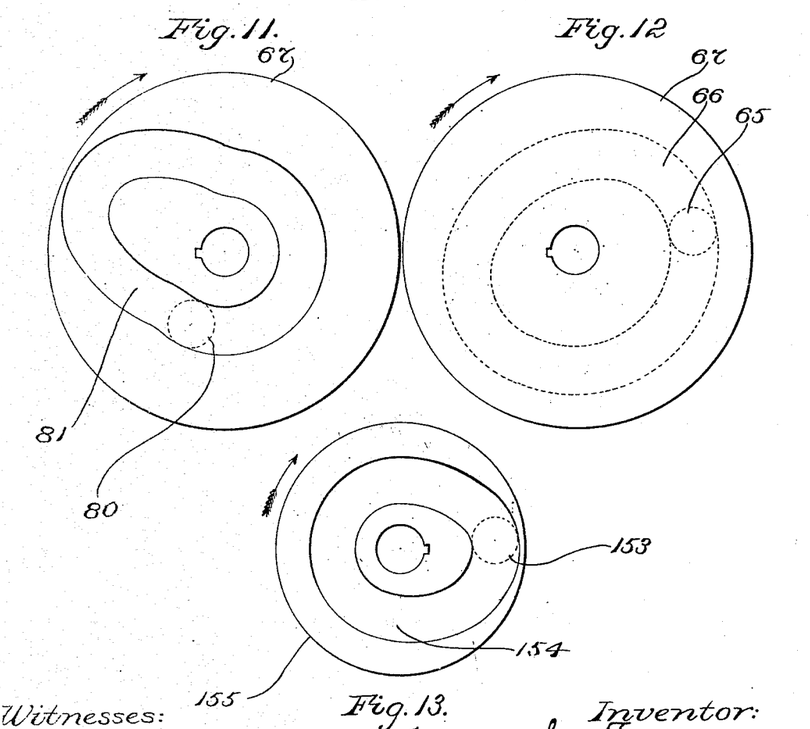
Figs. 11, 12, and 13 are views in elevation of certain cams which are described hereinafter.
Figure 14:
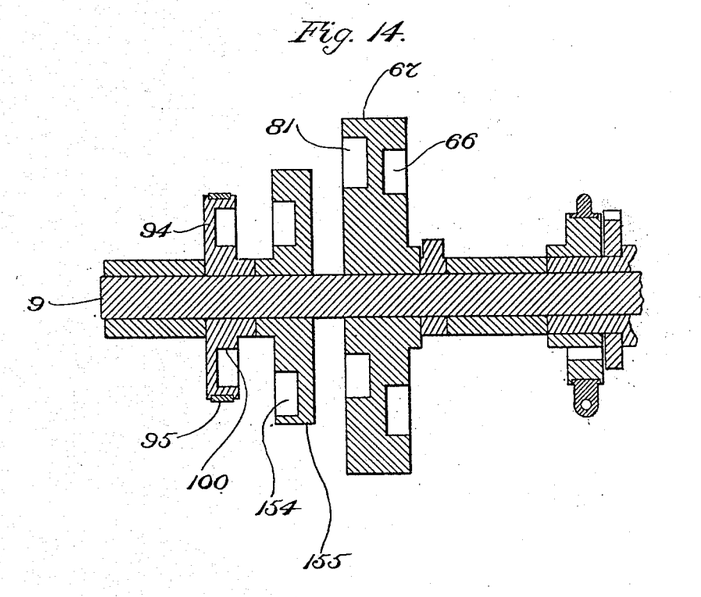
Fig. 14 is a view in longitudinal section of the main shaft of the machine and the parts which are mounted thereon and adjacent thereto.

73 is a plunger mounted with capacity for vertical movement in the head portion of the machine and having pivotally connected thereto a link or pair of links 74, which latter are also connected pivotally to an arm or arms 75, turning about a center at 76 in the head of the machine, the said arm or arms forming part of a lever having a rearwardly-extending arm 77, to which is connected the upper end of a rod 78, the latter at its lower end being connected to the lever 79, the said lever carrying a roller 80, which works in the groove 81 of the cam 67, as shown more particularly in Figs. 4 and 11. The link or links 74 and arm or arms 75 constitute a toggle. The plunger 73 is rabbeted, forming a shoulder 82. (See Figs. 1 and 3.)

83 is a locking device movably connected with the head 59 and adapted to engage with the shoulder 82 of the plunger 73. The locking device is herein shown as a lever 83, which is pivoted to the said head and has the upper end thereof adapted to engage with the said shoulder 82. The lever 83 gravitates normally into the position in which it is shown in Fig. 3, in which position its engaging portion is out of the path of movement of the shoulder 82. So long as the locking-lever remains out of the path of movement of the said shoulder 82 the descent of the plunger is ineffective to occasion the descent of the head 59, so that the said head and the carrier applied thereto remain in their raised position. The locking-lever 83 has a portion thereof, as at 84, which is arranged to be struck by the carrier 55, so that when the carrier moves forward it turns the locking-lever, and when the said carrier has reached the full extent of its forward movement the locking-lever 83 is swung into a position which enables the shoulder 82 to engage with the upper end of the lever. In the ensuing descent of the plunger 73 the head 59, together with the carrier, anvil, and cutting-block, is forced downward, so as to compress the stock against the cutting edge of the die and into the latter. Should the carrier be prevented in any manner from completing its forward movement, the lever 83 will not be placed in position to become engaged by the plunger, and the ensuing descent of the latter will be ineffective to move the head 59 and the parts which are carried thereby. The devices just described and the provisions for moving the carrier forward with a yielding force constitute safety devices which render it practically impossible for the operator to be cut by the action of the cutting-block, anvil, and die. The head 59 and the parts carried thereby after being depressed by the action of the plunger are raised again by the action of the spring 71. As will be obvious, the said spring in consequence of tending to hold the head 55 and connected parts in an elevated position opposes the action of the plunger 73 and its operating connections. The latter, therefore, are required to overcome the force of the said spring in occasioning the descent of the plunger. The reaction of the spring operates to take up all lost motion or play in the parts intermediate the plunger and its operating-cam. This is of exceedingly great importance in view of the fact that I make the cutting-block of steel or other suitable hard material, since in the working of the machine it is necessary that the said block in its descent should just come to the edge of the die and should neither stop short nor have a tendency to go too far, which would be the case if there were any backlash. Any lost motion, play, or backlash would allow the momentum of the parts to carry the cutting-block in its descent into contact with the edge of the die to the injury of both the die and the cutting-block. The spring 71 acts to entirely obviate injury from this cause.

The toggle, constituted of the members 74 75, is arranged substantially as shown in the drawings, it operating so that the retardation of the movement which it transmits to the plunger and cutting-block is greatest at or just before the instant at which the cutting-block reaches the die. In addition to this the cam, which has been referred to as actuating the said toggle and the plunger which is connected therewith, is constructed substantially as shown in Fig. 11, so that its grades operate to start the downward movement of the plunger slowly, then accelerating to the highest rate of speed, and then retarding up to the completion of the downward stroke. The outcome of the retardation, due to the action of the toggle plus the retardation resulting from the form of the cam, is that the cutting-block compresses the leather against the cutting edge of the die with simple pressure devoid of momentum, the momentum of the anvil, cutting-block, and other parts moving in unison therewith being held in check by the two retardations which are spoken of above. The centers of the toggle are in line vertically above the die, the result being that the greatest force is exerted directly in line downward upon the stock being cut. This eliminates the effect of springing and variations in the action of the levers and other actuating connections.

It has been explained hereinbefore that the cutting devices remain normally at rest in readiness for operation and are brought into play independently of the remainder of the machine at the will of the operator, in which case they act only once, after which they come to rest again. In like manner the cutting-block and anvil and their actuating connections remain normally at rest, they being adapted to be brought into action at the will of the operator, like the cutting devices, but independently of the latter, and thereby being rendered operative to make a single stroke of the cutting-block and anvil whenever required, after which they again remain at rest until once more called into play. The cutting devices aforesaid are brought into action by the operator whenever he presses sidewise the arm or lever 37 on the rock-shaft 36, as hereinbefore explained. In order to occasion a stroke of the cutting-block and anvil, I provide for producing at will a single revolution of the shaft 9, which latter normally stands at rest. To this end I couple the said shaft temporarily with a continuously-rotating driver. In the present case I utilize the band-pulley 10, which, as explained already, turns freely on the shaft 9. With the shaft 9 and band-pulley 10 I employ any suitable form of clutch devices. Any of the approved forms of friction-clutches will answer. In the drawings I show a cone 26, which coacts with the wall of a conical recess in the side of band-pulley 10, the said cone being mounted on shaft 9 and connected therewith in usual manner, so as to rotate in unison therewith while free to be moved longitudinally thereon. The cutting-block and the parts which are concerned in the actuation thereof normally remain at rest in the positions in which they are represented in the drawings. When, however, it is desired that the cutting-block should be caused to act, the friction-cone 26 is forced into contact with the band-pulley 10, thereby clutching the said band-pulley to the shaft 9 and operating the latter. For the purpose of moving the friction-cone 26 along the shaft 9 I provide the treadle 85, (see Figs. 2 and 4,) which is fast on the shaft 86, the said shaft carrying an arm 87, provided with a screw 88, one end of which latter bears against the arm 89, the said arm being affixed to the rock-shaft 90, on which rock-shaft is made fast the forked arm 91, which controls the position of the friction-cone 26, the said forked arm 91 engaging with the groove of the hub or collar 92 on the shaft 9. The spring 93, connected with the arm 89, restores the clutch-operating parts to their former position and moves the cone 26 out of engagement with the band-pulley 10.

For the purpose of preventing rotation of shaft 9, save when desired, and of arresting the movement thereof after a complete revolution of the same has occurred I employ the following devices: 94 is a brake-wheel which is made fast on the shaft 9, (see Figs. 2, 4, and 14,) and 95 is a brake-band passing around the said brake-wheel and having its ends connected to two of the arms of the three-armed lever 96, the third arm of the said lever being connected by the link 97 to the arm 98, which is fast on the treadle-shaft 86. When the treadle 85 is depressed, the pressure of the brake-band upon the brake-wheel is relaxed through the connections described, and when the spring 93 is allowed to operate to raise the treadle again it tightens the said brake-band on the brake-wheel simultaneously with the disengagement of the friction-cone 26 from the band-pulley 10. In order that the brake-band may be held from acting upon the brake-wheel during the time while the shaft 9 should revolve, the arm 98 carries a roller 99, working against the cam 100 on the hub of the brake-wheel 94. (See Figs. 4 and 14.) This cam is concentric with the shaft 9, save at a depressed portion of its periphery. The roller 99 usually rests on this depressed portion, it being borne against the surface of the cam 100 by the action of the spring 93, and while the parts are in the position which they occupy while the said depressed portion is presented to the roller 99 the friction-clutch is open or uncoupled and the brake-band is tightened upon the brake-wheel 94, thereby holding the shaft 9 from rotation. The depression of the treadle 85 by the operator relaxes the pressure of the brake-band simultaneously with causing the friction-cone 26 to be placed in engagement with the band-pulley 10. The rotation of the shaft 9, occasioned by such engagement, brings the concentric portion of the cam 100 around against the roller 99, the said portion operating to hold the cone 26 in engagement with the band-pulley 10 and also hold the brake-band relaxed until the said depressed portion of the cam 100 again presents itself to the roller 99, whereupon the spring 93 causes the arm 98 to move inward and operates the parts to disconnect the power and arrest the rotation of the shaft 9.

Figure 5:
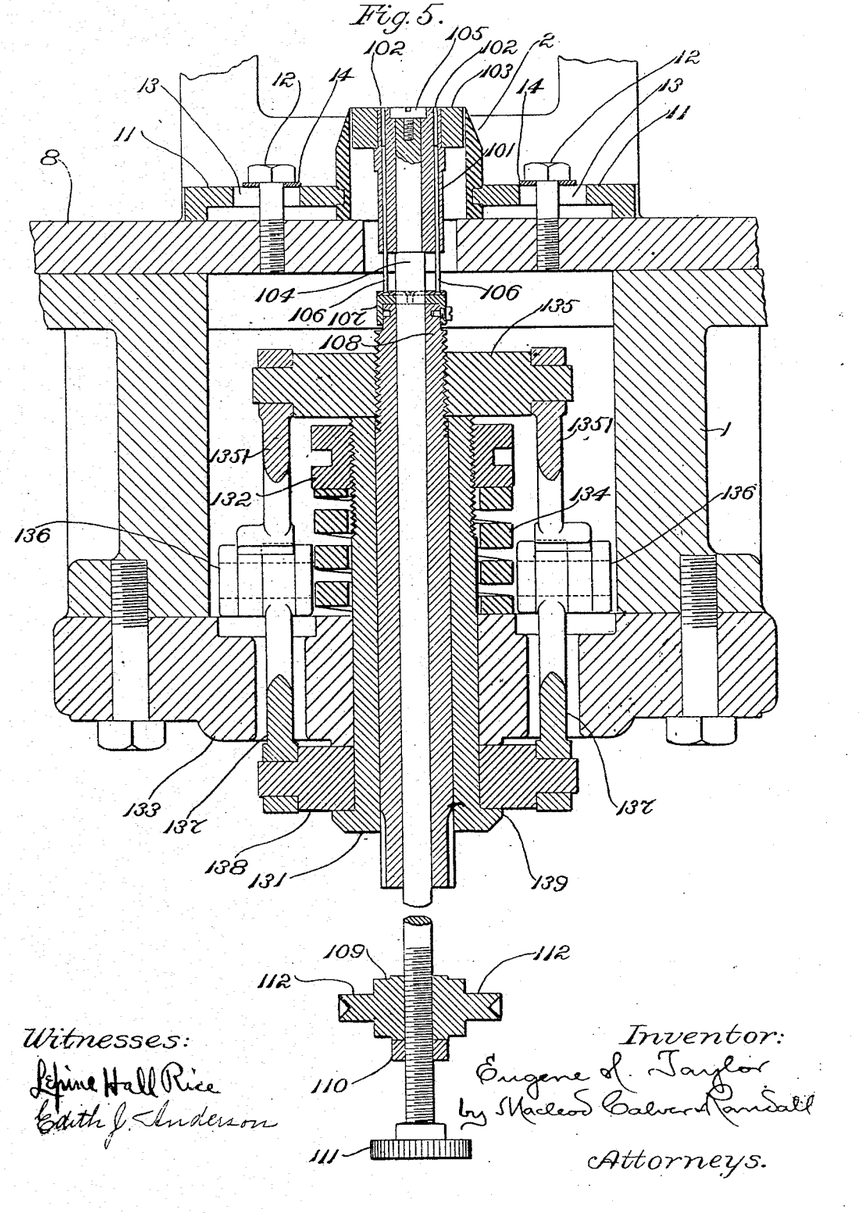
Fig. 5 is a view in vertical section of the die and the parts which are adjacent thereto.
Figure 6:
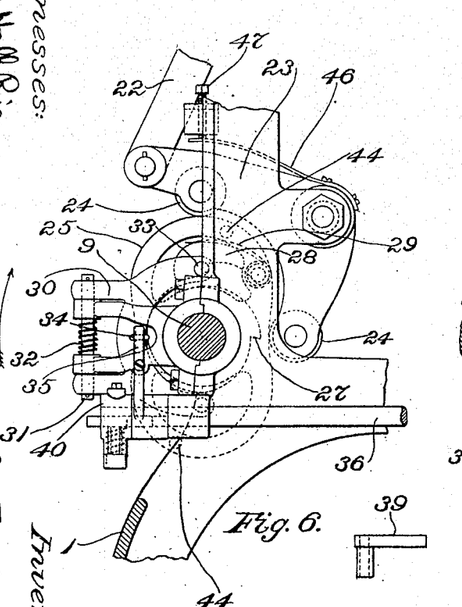
Fig. 6 is a view in side elevation, with certain portions in vertical section, of certain of the mechanism which is employed for actuating the cutters.
Figure 7:
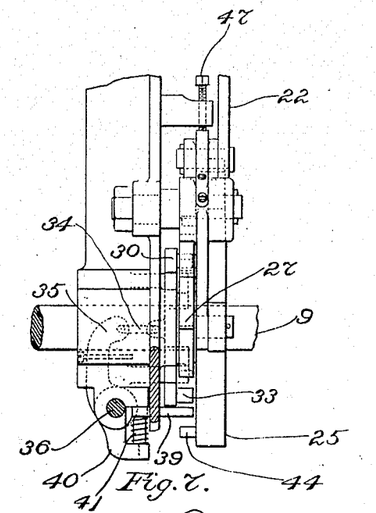
Fig. 7 is a view thereof looking from the right-hand side in Fig. 6.
Figure 8:
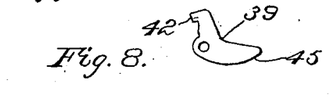
Fig. 8 shows views of the dog 39, which forms a part of the mechanism that is represented in Figs. 6 and 7.
Figure 9:
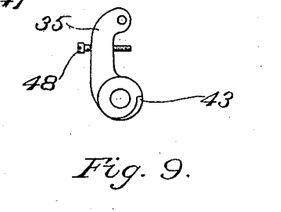
Fig. 9 is a view in elevation of the swinging arm which is engaged by the dog shown in Fig. 8.
Figure 10:
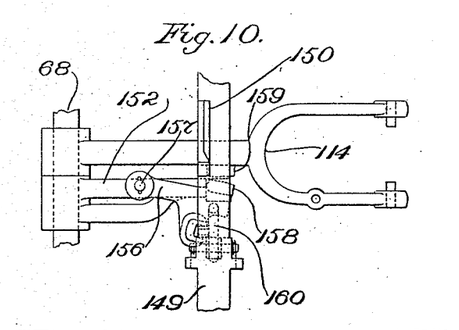
Fig. 10 is a view in plan of certain details which are referred to hereinafter.

Having reference more particularly to Fig. 5, the nail-holder in the die is shown at 101, the nail-receiving holes within the same being shown at 102 102, and the follower which fits within the die and surrounds the nail-holder is shown at 103, it resting as usual on an external shoulder of the nail-holder. At 104 is shown the central rod, on the upper end of which the nail-holder is mounted, the said nail-holder resting on an external shoulder of the said rod and being held in place thereon by the securing-screw 105. At 106 106 are the nail-drivers, having their lower ends connected with the holder 107, which latter is secured to the upper end of the sleeve 108, the stems of the said nail-drivers fitting in customary manner in the nail-receiving holes 102 102 of the nail-holder. The lower end of the rod 104 is screw-threaded (see also Figs. 2 and 4) and receives thereon the cross-head 109 and lock-nut 110, the said rod having the milled head 111, by means of which to turn the same when adjusting it relatively to the cross-head 109, as required in adjusting the nail-holder and follower with relation to the die. The arms 112 112 of the cross-head are shaped as journals and have fitted thereto the lower ends of the links 113 113, the upper ends of which links are pivoted to the forked forward end of the arm 114, which last is made fast on the shaft 68. To the shaft 68 is secured also a brake-wheel 115, around which is passed the brake-band 116, to the end of which latter is connected the adjusting-screw 117, which has applied thereto the adjusting-nut 118, whereby to regulate the friction of the brake-band 116 upon the brake-wheel 115 and control the descent of the arm 114, rod 104, and parts applied to the said rod within the die as the stock is driven into the said die by the action of the anvil and cutting-block. The ends of the arms 112 are formed with conical recesses, in which are received the conical tips of the center screws 118 118, which latter are applied to the forked forward end of the lever 119, the said lever being pivoted at mid-length thereof to the lower end of the vertical freely-swinging link or radius bar 120, which has its upper end pivoted to a fixed support, the rear end of the said lever 119 carrying a swiveled block 121, through which is passed the lower end of the vertical rod 122, the said rod being adjustably clamped within the said block by the screw 123 and having its upper end connected to the lever 124, (see Fig. 3,) the forward end of which is connected by a short link 125 to the sliding index 126 of the scale 127, the latter being applied to the head portion of the machine and provided with the graduations 128 and with the slot 129, along which the fixed index 130 is capable of being adjusted. The moving index 126 indicates the extent to which the die has been filled with stock, and the fixed index 130 indicates the extent to which the die should be filled in order to produce the desired heel. The sleeve 108 fits within a second but shorter sleeve 131. The upper end of the sleeve 131 is externally threaded and has applied thereto the internally-threaded collar 132, between which latter and a plate 133, which is attached to the machine-frame, the exterior of the sleeve 131 is surrounded by a spiral spring 134, the said spring being compressed between the said collar 132 and the said plate 133. 135 designates a cross-head, which is fitted to the screw-threaded upper end of the sleeve 108, the said cross-head 135 resting normally on the upper end of the sleeve 131. Thus it follows that the sleeve 131, the cross-head 135, the sleeve 108, and the driver-holder and the drivers are upheld vertically by the spring 134. By rotating the collar 132 the tension of the spring 134 may be adjusted. For the purpose of adjusting the height of the drivers the sleeve 108, it constituting the driver-support, is rotated, which screws it either up or down through the cross-head 135, as the case may be, until the drivers 106 106 have been placed at the right height to suit the length of nail and thickness of heel. As the die fills the nail-holder and follower are forced down in the die, the rod 104 sliding through the driver-supporting sleeve 108 until finally the lower end of the nail-holder may take bearing against the driver-holder 107 on the upper end of the said sleeve. In case too much stock is driven into the die in the operation of the machine the spring 134 acts as a cushion and yields to the pressure which is transmitted thereto through the parts in consequence of the lower end of the nail-holder 101 being forced against the driver-holder on the upper end of the sleeve 108. To the journals which are provided at the opposite ends of the cross-heads 135 are connected pivotally the upper ends of links 1351 1351, the lower ends of which are connected pivotally by pins 136 136 to the upper ends of other links 137 137, which latter at their lower ends are connected pivotally to the journals which are formed at the ends of the second cross-head 138, the latter being mounted upon the lower end of the sleeve 131 and resting upon a flange or shoulder at 139 on the said lower end. The upward pressure which is exerted by the spring 134 upon the sleeve 131 serves to hold the cross-head 138 pressed firmly against the lower side of plate 133. The four links 1351 1351 137 137 constitute a toggle, and for the purpose of operating the same I connect with the pins at 136 the forward end or ends of the link or links 140, the rear end or ends of the said link or links being supported by the radius bar or arm 141, which is pivoted by its upper end at 142 to the machine-framing. 143 designates a hooked catch, which is pivotally mounted upon the arm 141 and is either weighted or connected with a spring 144, so as to keep its hook or engaging end out of the path of a moving pin or the like, here designated 145. For convenience I have applied the said pin 145 to the lever 64, by means of which the carrier 55 is moved horizontally. The toggle and connected parts which I have thus described are provided for use in clenching the nails at the time of the completion of a heel. To effect this result, it is necessary only that the catch 143 should be caused to engage with the pin 145 in the advancing movement of the lever 64. When this engagement has been caused to take place, the toggles are straightened, raising a short distance the cross-head 135, the driver-support 108, and the drivers, thus enabling the anvil to properly perform the clenching in the descent thereof which now takes place. At this time the lower cross-head 138, it resting upon the flange 139 of the sleeve 131, which latter in turn is supported by the spring 134, serves as the abutment or support from which the pressure transmitted through the toggle reacts. In consequence of the spring-support which is afforded the said lower cross-head it yields to any excess of pressure, the spring 134 thus serving to cushion the parts during the operation of clenching. In order that the operator may cause the catch 143 to become engaged with the moving pin 145 at the time when on inspection of the scale 127 and indexes 126 and 130 he ascertains that the die is sufficiently full, various forms of operating devices may be employed in connection with the said catch. I have shown in the accompanying drawings (see more particularly Figs. 2 and 4) a horizontally-movable hand-operated lever 146, it turning on the pivot 147 at its rear end and being operated upon by a spring 148, which tends to move it toward the left-hand side of the machine. To this lever 146 I connect one end of a bar 149, the opposite end of which may be connected conveniently to a horizontally-swinging bar 150, capable of moving in unison with the lever 146, as indicated in Fig. 2. Upon the upper side of this bar 149 I provide an inclined cam 150, (see also Fig. 10,) which when the said bar is carried toward the right-hand side in Fig. 2 by movement of the hand-lever 146 in that direction acts upon the forwardly-projecting tail of the catch 143, moving the hook portion of the said catch into engagement with the moving pin 145, which latter thereupon transmits movement to the parts which effect the clenching. Immediately after the clenching the completed heel should be ejected from the die. In order to enable the ejection to be effected automatically, I provide the following devices: At 152 is a triangular lever which I mount loosely upon the cross-shaft 68, it carrying a roller 153, which works in the groove 154 of the cam 155 on the shaft 9. On this lever 152 I mount a horizontally-moving part, here shown as an arm 156, which is pivoted to the said triangular lever. This arm 156 is formed with a shoulder 158, which at certain times is caused to pass under a corresponding shoulder 159 on the arm 114. The arm 156 is swung toward the side of the arm 114 when the hand-lever 146 is moved toward the right-hand side in order to occasion the clenching by means of a connection with the bar 149, such connection consisting of a finger 160, which is pivoted to the said bar, the said finger being acted upon by a spring 161, which holds the tail 162 thereof pressed against the under side of the bar, as shown in dotted lines in Fig. 2. The finger thus acts yieldingly in effecting the movement of arm 156 toward the right. Should the shoulder 159 on the arm 114 be in the path of the shoulder 158, and thus prevent the arm 156 from being carried fully to the right by the movement of the hand-lever 146, the spring-lever 161 yields until in the descent of the triangular lever 152 the shoulder 158 is carried below the shoulder 159, whereupon the spring acts to complete the movement of the arm 156 and carry the shoulder 158 beneath the shoulder 159. Thereafter when the lever 152 next swings upwardly the engagement of the shoulder 158 with the under side of the shoulder 159 causes the arm 114 to be raised, and thereby through the connection of the said arm with the rod 104 the said rod is pushed upward, and with it the nail-holder and follower are raised, thus ejecting the heel from the die. In consequence of the lever 146 being moved by hand by the operator rather than automatically by the action of the machine I find it advisable to employ in connection with the said hand-lever devices which shall retain it in its right-hand position until after the performance of the operations which are controlled thereby. To this end I provide the gravitating catch 163, which latter engages with the said hand-lever and holds it in the said right-hand position until by the lifting of the arm 114 a stop on the said arm, herein shown as constituted by an adjustable screw 164, carried against the tail of the said catch 163, (see Fig. 2,) whereupon the catch 163 is disengaged and the spring 148 is allowed to return the hand-lever to the position in which it is shown in Fig. 2.

165 165 are slanting chutes through which the waste leather trimmed off by the cutters is discharged.

I claim as my invention—

1. The combination with the trimming-cutters, of improved actuating mechanism therefor comprising a rotatable actuator, transmitting connections therefrom to the cutters, the dog or pawl connected with the said actuator, the rotating detent-wheel with which the said dog or pawl engages, the laterally-movable spring-pressed frame having a projection which normally locks with said dog or pawl and holds it out of engagement with said detent-wheel, and actuating connections whereby said frame may be disengaged from said dog or pawl to cause the cutters to act at the will of the operator, such connections containing trip devices to cause the release of the frame and permit it to effect the disengagement of the dog or pawl from the detent-wheel, substantially as described.

2. The combination with the trimming-cutters, of the improved actuating mechanism therefor comprising a rotatable actuator, transmitting connections therefrom to the cutters, the dog or pawl connected with the said actuator, the rotating detent-wheel with which the said dog or pawl engages, the laterally-movable spring-pressed frame having a projection which normally locks with the said dog or pawl and holds it out of engagement with said detent-wheel, the arm 35 connected with said frame, an actuator, as 36, for the said arm movable by the operator, a dog to connect said arm and actuator whereby on movement being given to the actuator the arm and frame may be moved to disengage the frame from said dog or pawl to cause the cutters to act, and a trip device to disengage the dog from the arm 35 and permit the frame to return and disengage the said dog or pawl from the said detent-wheel, substantially as described.

3. The combination with the trimming-cutters, of the improved actuating mechanism therefor comprising the toggle, the eccentric 49, transmitting connections intermediate said eccentric and toggle, the dog or pawl connected to the said eccentric, the rotating detent-wheel with which the said dog or pawl engages, the laterally-movable spring-pressed frame having the pins 33, 33, to engage with the said dog or pawl, the arm 35 connected with the said frame, the rock-shaft 36 movable by the operator, the dog to connect said arm and rock-shaft, and the trip device to disengage the dog from the arm and permit the frame to return and disengage the said dog or pawl from the said detent-wheel, substantially as described.

4. The combination with the die, and the cutting-block, of means to move the said cutting-block vertically with relation to the die, and also transversely with provision for yielding in case the cutting-block meets with an obstacle in passing forward into position over the die, substantially as described.

5. The combination with the die, and the cutting-block, of the head on which the cutting-block is mounted with capacity to move horizontally, means to reciprocate the said head vertically and means to move the said cutting-block horizontally on the latter head with reference to the eye, the said means having provision for yielding in case the cutting-block meets with an obstacle in its movement into position over the die, substantially as described.

6. The combination with the die, the cutting-block, and the carrier for the said cutting-block, of the head on which the said carrier is mounted to slide horizontally, means to reciprocate the said head vertically, the rod 60, the spring applied to the said rod, a stop on the outer end of the said rod, the block 61 interposed between the said spring and stop, the lever 64 engaging said block, and means to actuate the said lever, substantially as described.

7. The combination with the die, the cutting-block and means to impart both vertical and horizontal movement to the cutting-block, of controlling devices to prevent vertical action of said cutting-block on failure of the latter to complete its movement forward into proper position over the die, substantially as described.

8. The combination with the die, and the cutting-block movable both vertically and transversely with relation to the die, of actuating devices for said cutting-block, including a locking device which is set by the cutting-block when the latter is brought fully over the die, and whereby the movement of the cutting-block toward the die is occasioned, substantially as described.

9. The combination with the cutting-block, of a head as 59, on which said cutting-block is mounted with capacity to move horizontally, means to move the said cutting-block horizontally, a plunger, means to reciprocate the same vertically, and a locking device coöperating with said head and plunger and leaving the said head and plunger disconnected from each other except when the cutting-block has been moved forward fully into working position, substantially as described.

10. The combination with the cutting-block and its carrier, of a head, as 59, on which the said carrier is mounted, means to move the said carrier horizontally on the said head, a plunger, means to reciprocate the same vertically, and a locking device which when the carrier and cutting-block are moved forward horizontally fully into working position is caused to lock the head and plunger together so that they shall move vertically in unison, substantially as described.

11. The combination with the cutting-block and its carrier, of a head, as 59, on which the said carrier is mounted, means to move the said carrier horizontally on the said head, a plunger, means to reciprocate the same vertically, and the locking-lever mounted upon the said head and operated by the carrier when the latter has been moved forward horizontally fully into working position, whereby the said lever is caused to become engaged by the plunger, substantially as described.

12. The combination with the cutting-block and its carrier, of a head, as 59, on which the said carrier is mounted, means to move the said carrier horizontally on the said head, the said means having capacity to yield in case an obstacle is encountered by the cutting-block in its forward movement, a plunger, means to reciprocate the same vertically, and a locking device coöperating with the said head and plunger and leaving the said head and plunger disconnected from each other except when the carrier and cutting-block have been moved forward fully into working position, substantially as described.

13. The combination with the die, the cutting-block, the head on which said cutting-block is mounted, the rod which is connected with the said head, and the spring applied to the said rod and serving to sustain the head and cutting-block vertically, of the plunger by which the said head and cutting-block are actuated, the lock to connect the plunger and head and means to move the said plunger, substantially as described.

14. The combination with the die, the cutting-block, its carrier, the head on which said carrier is supported, means to move the said carrier horizontally on the said head, the rod which is connected with the said head, and the spring applied to the said rod and serving to sustain the head and cutting-block vertically, of the plunger, means to move the said plunger, and the locking device moved by the carrier when it and the cutting-block have been moved fully forward horizontally into working position, the said locking device being thereby caused to engage with the plunger, substantially as described.

15. The combination with the die, the follower and nail-holder within the same, and the nail-drivers, of the sleeve 108, the crosshead applied to the screw-threaded exterior of the said sleeve and adjustable thereon, and the spring-supported exterior sleeve 131 on the upper end of which the said cross-head bears, substantially as described.

16. The combination with the die, the follower and nail-holder within the same, and the nail-drivers, of the sleeve 108, the crosshead applied to the screw-threaded exterior of the said sleeve and adjustable thereon, the exterior sleeve 131 on the upper end of which the said cross-head bears, the adjustable collar 132 on the upper portion of sleeve 131 and the spring on which the said collar rests, substantially as described.

17. The combination with the nail-drivers, and the driver-support, of the cross-head 135 operatively applied to the said driver-support, the toggles operatively connected with the opposite ends of the said cross-head, and devices to operate the said toggles to thereby actuate the driver-support and nail-drivers to effect the clenching, substantially as described.

18. The combination with the nail-drivers, the driver-support 108, the sleeve 131, surrounding the said driver-support, the collar on the upper portion of said sleeve, the spring on which said collar rests, the cross-head applied to the upper portion of said driver-support, the cross-head supported by the said sleeve 131, the toggles interposed between the said cross-heads and means to operate the said toggles to actuate the driver-support and drivers to effect the clenching, substantially as described.

19. The combination with the nail-drivers, the driver-support 108, the sleeve 131 surrounding the said driver-support, the collar adjustable on the screw-threaded upper portion of the said sleeve, the spring on which the said collar rests, the cross-head adjustable on the screw-threaded upper portion of the driver-support, the cross-head supported by the said sleeve 131, the toggles interposed between the said cross-heads, and means to operate the said toggles to actuate the driver-support and drivers to effect the clenching, substantially as described.

20. The combination with the nail-drivers, the driver-support, and the toggles operatively connected with the said driver-support, of a latching device, as 143, operatively connected with the said toggles, a moving part of the machine, a cam as 150 to act on said latching device and place it in engagement with the said moving part, and a hand-lever as 146 operatively connected with the said cam, substantially as described.

21. The combination with the die, a filling-piece or follower within the same, and a movable part, as 114, operatively connected with the said filling-piece or follower, of a moving part of the machine, as 152, a movable latch carried by one of the said parts and adapted in a given position thereof to engage the other of said parts, and means to move said latch into its engaging position in order to effect the ejectment of a completed heel from the die, substantially as described.

22. The combination with the die, a filling-piece or follower within the same, and a movable part, as 114, operatively connected with the said filling-piece or follower, of a moving part of the machine, as 152, a movable latch carried by one of the said parts and adapted in a given position thereof to engage the other of said parts, a yielding finger loosely engaging with said latch to serve in moving the same, and a hand-operated shifter, as 146, for moving said finger, substantially as described.

23. The combination with the die, a filling-piece or follower within the same, a movable part, as 114, operatively connected with the said filling-piece or follower, a moving part of the machine, as 152, a movable latch carried by one of said parts and adapted in a given position thereof to engage the other of said parts, the nail-drivers, the driver-support, devices to actuate said driver-support to effect the clenching, a latch operatively connected with the said devices, a moving part of the machine, as 64, with which the latter latch may engage, and a shifter device as 146, operatively connected with said latches and serving to actuate the same to occasion the clenching and the ejection, substantially as described.

24. The combination with the die, a filling-piece or follower within the same, a movable part, as 114, operatively connected with the said filling-piece or follower, a moving part of the machine, as 152, a movable latch carried by one of said parts and adapted in a given position thereof to engage the other of said parts, the nail-drivers, the driver-support, the toggles operatively connected with the said driver-support, a latch connected with the said toggles, a moving part of the machine with which the latter latch may engage, and a shifter device as 146, operatively connected with the said latches and serving to actuate the same to occasion the clenching and the ejection, substantially as described.

25. The combination with the carrier, of the anvil secured to the said carrier and having the threaded exterior and the cutting-block screwing upon the said exterior of the anvil, substantially as described.

In testimony whereof I affix my signature in presence of two witnesses.

EUGENE H. TAYLOR.

Witnesses:
CHAS. F. RANDALL,
WILLIAM A. COPELAND.